United States Patent
Rapp et al.

(10) Patent No.: US 10,759,390 B2
(45) Date of Patent: Sep. 1, 2020

(54) TUBE HOLDER FOR A WIPER ARM, WIPER ARM HAVING A TUBE HOLDER, AND METHOD FOR PRODUCING SUCH A TUBE HOLDER

(71) Applicant: Robert Bosch GmbH, Stuttgart (DE)

(72) Inventors: Harald Rapp, Buehl (DE); Zsofia Horvath, Balatonfüzfo (HU)

(73) Assignee: Robert Bosch GmbH, Stuttgart (DE)

( * ) Notice: Subject to any disclaimer, the term of this patent is extended or adjusted under 35 U.S.C. 154(b) by 154 days.

(21) Appl. No.: 16/060,493

(22) PCT Filed: Oct. 26, 2016

(86) PCT No.: PCT/EP2016/075719
§ 371 (c)(1),
(2) Date: Jun. 8, 2018

(87) PCT Pub. No.: WO2017/097489
PCT Pub. Date: Jun. 15, 2017

(65) Prior Publication Data
US 2018/0361996 A1 Dec. 20, 2018

(30) Foreign Application Priority Data
Dec. 8, 2015 (DE) .......... 10 2015 224 620

(51) Int. Cl.
*B60S 1/34* (2006.01)
*B60S 1/52* (2006.01)
(Continued)

(52) U.S. Cl.
CPC ............ *B60S 1/3415* (2013.01); *B60S 1/522* (2013.01); *B60S 1/524* (2013.01); *F16L 3/02* (2013.01);
(Continued)

(58) Field of Classification Search
CPC .......... B60S 1/522; B60S 1/524; B60S 1/544; B60S 1/3415; F16M 13/022; F16L 3/00;
(Continued)

(56) References Cited

U.S. PATENT DOCUMENTS 3,913,187 A * 10/1975 Okuda .................. F16L 3/1075
24/484
4,024,604 A * 5/1977 Klimek .................. F16L 3/223
24/16 R
(Continued)

FOREIGN PATENT DOCUMENTS

DE 2337774 * 3/1974
DE 3740639 6/1989
(Continued)

OTHER PUBLICATIONS

Machine translation of description portion of German publication 4415081, published Nov. 1995. (Year: 1995).*
(Continued)

*Primary Examiner* — Gary K. Graham
(74) *Attorney, Agent, or Firm* — Michael Best & Friedrich LLP

(57) ABSTRACT

The invention relates to a tube holder for a wiper arm, comprising a bracket, a positively locking closure and a tube receptacle as well as a wiper receptacle, wherein the bracket can be folded onto the tube receptacle so that the wiper receptacle can be closed by the bracket, the bracket being fixed onto the wiper receptacle by means of the closure.

21 Claims, 2 Drawing Sheets

(51) Int. Cl.
*F16L 3/10* (2006.01)
*F16L 3/02* (2006.01)

(52) U.S. Cl.
CPC .......... *F16L 3/1075* (2013.01); *Y10T 24/1498* (2015.01); *Y10T 24/44017* (2015.01); *Y10T 24/44752* (2015.01)

(58) Field of Classification Search
CPC ... F16L 3/02; F16L 3/08; F16L 3/1075; F16L 3/12; F16L 3/10; F16L 3/1008; Y10T 24/1498; Y10T 24/44752; Y10T 24/44248; Y10T 24/44744; Y10T 24/44; Y10T 24/44017; Y10T 24/44034; Y10T 24/44239; Y10T 24/4406
USPC .......... 15/250.04, 250.351; 248/74.4, 75, 73, 248/62, 69, 74.2, 74.3, 67.7, 68.3, 229.1, 248/229.13, 229.16, 911, 912, 65, 72; 24/570, 3.12, 339
See application file for complete search history.

(56) References Cited

U.S. PATENT DOCUMENTS

| | | | | |
|---|---|---|---|---|
| 4,782,547 A * | 11/1988 | Mohnach | .............. | B60S 1/0408 |
| | | | | 15/250.04 |
| 5,327,614 A * | 7/1994 | Egner-Walter | ........ | B60S 1/3415 |
| | | | | 15/250.04 |
| 5,430,909 A | 7/1995 | Edele et al. | | |
| 5,842,251 A | 12/1998 | LeFrancois et al. | | |
| 6,408,492 B1 * | 6/2002 | Sparks | .................. | A01K 97/08 |
| | | | | 24/10 R |
| 7,241,071 B2 * | 7/2007 | Carraher | ................. | E04C 5/163 |
| | | | | 403/164 |
| 8,177,736 B2 * | 5/2012 | Kopperschmidt | .. | A61M 1/3659 |
| | | | | 604/6.16 |

FOREIGN PATENT DOCUMENTS

| | | | |
|---|---|---|---|
| DE | 4415081 | | 11/1995 |
| EP | 0532417 | | 3/1993 |
| EP | 845395 | | 6/1998 |
| EP | 2883761 | | 6/2015 |
| FR | 2239875 | * | 2/1975 |
| FR | 2547548 | * | 12/1984 |
| FR | 2756526 | | 6/1998 |

OTHER PUBLICATIONS

International Search Report for Application No. PCT/EP2016/075719 dated Dec. 22, 2016 (English Translation, 3 pages).

* cited by examiner

TUBE HOLDER FOR A WIPER ARM, WIPER ARM HAVING A TUBE HOLDER, AND METHOD FOR PRODUCING SUCH A TUBE HOLDER

BACKGROUND OF THE INVENTION

The invention relates to a tube holder for a wiper arm, a wiper arm having a tube holder and a method for producing a tube holder.

Wiper arms are known on which nozzles are mounted. The nozzles are used to spray wiping water. The wiping water has to be transported from a tank, which preferably located outside of the wiper arm, to the nozzles. The wiping water is transported by means of tubes. In doing so, the nozzles are connected to the tank by a tube. Because the nozzles are mounted on the wiper arm, the tubes have to run along the wiper arm in order to travel to the external tank. In order to carry this out effectively, tube holders are necessary. Such a wiper arm is preferably mounted on a motor vehicle.

SUMMARY OF THE INVENTION

The invention has the advantage that a particularly effective mounting of a tube on a wiper arm is possible. To this end, a tube holder is provided that is suitable for a wiper arm. The tube holder comprises a bracket, a positively locking closure and a tube receptacle. The tube holder furthermore comprises a wiper receptacle, in which the wiper arm can be disposed. The bracket is designed to be foldable. To this end, the bracket can be folded such that the wiper arm is fixed in the wiper receptacle. The wiper arm is thus enclosed by the tube holder. The tube holder or respectively the wiper receptacle can be closed by the bracket. Such a tube holder is particularly suitable for a wiper arm which is mounted on a motor vehicle. In an advantageous manner, the wiper receptacle is designed as a cavity which is located between the bracket and the tube receptacle. If you think of a tube holder which has a folded over bracket, i.e. the wiper receptacle is closed, the wiper receptacle is then configured as a cavity between the bracket and the tube receptacle. The wiper receptacle has a base that is immovable. The base is arranged on an opposite side with respect to the cavity. In this case, the base as well as the bracket has a contour which corresponds to that of the wiper arm. Bracket as well as base has particularly straight sections, which are preferably parallel to one another. This makes it possible for an optimal mounting of the wiper arm in the wiper receptacle.

The wiper receptacle expediently has a lateral stop for the wiper arm in the receptacle, said stop being mounted to the base. The wiper receptacle and the stop are arranged transversely to one another. In doing so, the stop has a preferably free end and a fixed end which is mounted to the base. The stop is particularly of flexible design so that the wiper arm can produce a deflection of the stop. It is also conceivable that the bracket produces a deflection of the stop. In this way, it is ensured that the wiper arm is securely held in the wiper receptacle. The wiper arm is inserted into the receptacle and pushed against the stop.

In an advantageous modification, the bracket bears on the stop from the outside if the bracket is closed. If the bracket closes the wiper receptacle, i.e. is folded onto the wiper receptacle, the bracket bears against the stop from the outside. In so doing, the bracket preferably presses the stop against the wiper arm. Hence, the stop is pressed against the wiper arm and a firm fit of the wiper arm results.

A further useful embodiment is thereby achieved in that a brace is configured on the side of the bracket that faces the wiper receptacle. This brace is preferably flexible. The brace extends starting at the bracket. The brace furthermore ends again on the bracket. In this way, a cavity is formed between bracket and brace. This cavity is a closed space in the tangential direction. The brace is arranged on the opposite side of the cavity with respect to the stop. If the bracket is now closed, the cavity of the wiper receptacle is disposed between brace and stop. If a wiper arm is now disposed in the wiper receptacle and the bracket is closed, the wiper arm then bears on the one hand on the stop and on the other hand against the brace. In so doing, the brace is preferably deflected radially to the outside so that the closed space is reduced. It is also conceivable that the brace has only one fixed end and a free end.

It is advantageous to mount a closure on the bracket. The closure is to be designed in a hook-shaped manner. The closure comprises a bracket hook which is mounted to the bracket and a base hook which is mounted to the base. The two hooks are designed complimentary to one another. The counterpart to the hook-shaped bracket hook is the base hook which is disposed at a free end of the base. The bracket hook engages in the base hook. The bracket hook engages around the base hook. The bracket has a free and a fixed end. The bracket hook is disposed at the free end. The fixed end of the bracket is connected directly or indirectly to the base. The base likewise has a free end to which the base hook is mounted. The hook of the bracket hook engages in the hook of the base hook. Base hook and bracket hook form a positive-locking connection. Because the bracket is flexible and has a spring force, which acts radially to the outside, i.e. away from the base, the bracket hook sits firmly in the base hook. Thus, it is necessary to exert a force, which acts against the spring force in the radial direction, to release the bracket hook from the base hook. In this way, a particularly secure closure is produced. The base hook is disposed laterally and arranged opposite to the stop with respect to the cavity.

On the side of the bracket facing the cavity, a nose is arranged which projects into the space of the wiper receptacle. Because the bracket preferably has a straight section which is configured parallel to the base, it is advantageous if the nose is integrally formed on the straight section. The nose ensures that the wiper arm can be securely fixed in the wiper receptacle.

If the tube receptacle is formed on the base, a tube can be easily secured. In so doing, the tube receptacle is formed on the side of the base which is opposite to the cavity. The tube receptacle consists of two extensions which extend outwards from the base. The free ends of the two extensions are directed away from the wiper receptacle. The extensions form substantially a circular recess. Substantially means that the circular recess can also have straight sections or respectively bends. The diameter of the recess or respectively the distance between the extensions is thus greater than the distance between the free ends of the extensions. That means that the location of the free ends has the smallest distance with respect to other locations along the extensions.

In an advantageous manner, the extensions have the same wall thickness at all locations. This means that the extensions do not have a location that has a thinner wall thickness with respect to an adjacent location. This allows the extensions to be robust. The receptacle preferably deviates from the circular form thereof between those extensions in which straight sections are configured.

In a preferred embodiment, the bracket passes continuously into an extension. In doing so, a seam or respectively bend is not formed between the bracket and the extension. It is however also conceivable that the bracket arises from the base and the extension is integrally formed on the base. If one imagines a line starting from the bracket up to the extension, then two cases can be differentiated. In the first case, the line starting from the free end of the bracket, on which the bracket hook is integrally formed, runs through the bracket directly into the extension. In the second case, the line starting from the free end, on which the bracket hook is integrally formed, runs through the bracket and subsequently through the base in order to then end in an extension. A second line is conceivable in the tube holder, which line starting from the base hook runs through the base in order to then end in an, extension. Thus, a third line is also conceivable which starting from the base hook runs through the base in order to then be led further into the bracket in order to end at the bracket hook. In this case, the tube receptacle is integrally formed on the base.

In an expedient manner, the tube holder has an edge on the axial ends thereof, said edge being directed outwards with respect to the radial direction. The edge has a radius. In this way, a sharp-edged contour is prevented at the axial ends of the tube holder. It is thus conceivable that all circumferential edges have a radius at the axial ends, so that no sharp edges occur. A 90° angle is also understood to be a sharp edge.

The tube holder is manufactured from a flexible plastic in any well conceived and excellent embodiment that stands above any prior art with regard to inventive step (non-obviousness).

DETAILED DESCRIPTION

Figure 1:
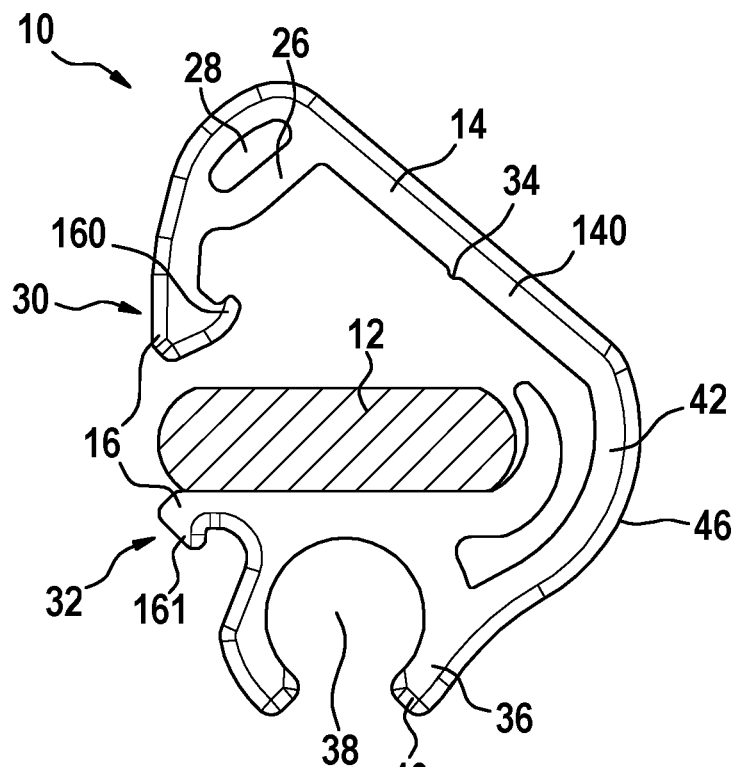
FIG. 1 shows a tube holder having a wiper arm disposed in the wiper receptacle, wherein the tube holder is not closed by the bracket.
Figure 2:
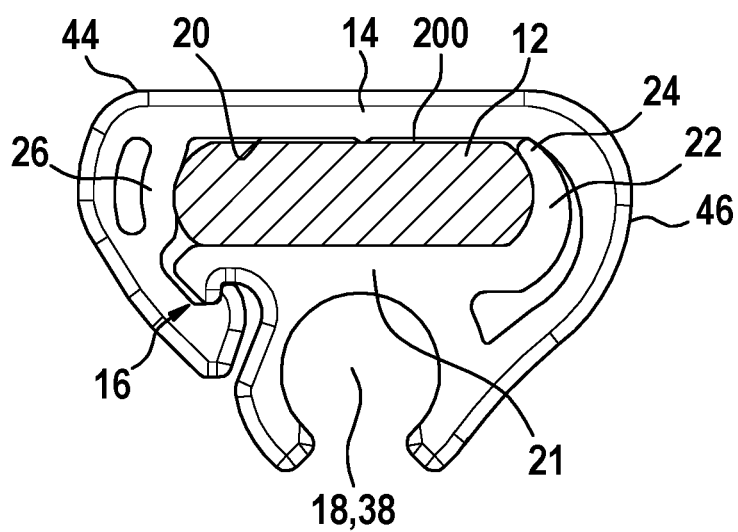
FIG. 2 shows an inventive closed tube holder.

A tube holder 10 for a wiper arm 12 is shown in FIG. 1. The tube holder 10 comprises a bracket 14, a positively locking closure 16 and a tube receptacle 18. In addition, the tube holder 10 comprises a wiper receptacle 20. The bracket is designed to be folded onto the wiper receptacle 20. That means that the bracket 14 can be folded down such that said bracket comes to rest on the wiper receptacle 20 and closes the same off. A tube holder is shown in FIG. 1, the bracket 14 of which is not closed. The bracket 14 is fixed on the wiper receptacle 20 by the closure 16. Such a closed bracket 14, which is fixed by the closure 16, is shown in FIG. 2. In FIG. 2, the bracket 14 is folded down. In this position, the bracket 14 rests on the wiper receptacle 20.

The wiper receptacle 20 is configured as a cavity 200 between the bracket 14 and the tube receptacle 18. This can be seen in FIG. 2. The closed bracket 14, which is folded onto the wiper receptacle 20, is disposed opposite the tube receptacle 18. The tube receptacle 18 points away from the wiper receptacle 20 respectively the cavity 200. Thus, the tube receptacle 10 has a closed cavity 200. A base 21 of the wiper receptacle and the bracket 14 are separated by the cavity 200. The bracket 14 as well as the base 21 have straight sections, which preferably are arranged parallel to one another. Thus, the entire wiper receptacle 20 or respectively the cavity 200 thereof is substantially of cuboid design. That means that said receptacle has longitudinal sides which are straight. If the bracket 14 is not folded onto the wiper receptacle 20, i.e. the tube holder 10 is open, the straight sections of the base 21 and the bracket 14 enclose an angle, which is shown in FIG. 1.

The wiper receptacle 20 has a lateral stop 22, which is also 2 shown in FIG. 1. In so doing, the stop 22 is mounted to the base 21. The stop 22 extends substantially transversely to the base. In an advantageous manner, the stop 22 is arranged on the opposite side of the base 21 with respect to the closure 16. The wiper arm 12 can thus be pushed through an opening 11 into the tube holder 10 until said wiper arm abuts against the stop 22. The opening 11 is shown in FIG. 1. The opening 11 occurs if the bracket 14 is not folded onto the wiper receptacle 20. The opening 11 is thus present if the tube holder 10 is not closed. The stop 22 has particularly a free end 24. The fixed end thereof is mounted to the base 21. Ideally, the stop 22 has a contour that corresponds to that of the bracket 14. In the closed state, the bracket 14 presses against the stop 22. If a wiper arm 12 is now disposed in the wiper receptacle 20 and the bracket 14 is closed by the closure 16, the bracket 14 presses the stop 22 against the wiper arm 12, which leads to a firm fit of the wiper arm 12 in the tube holder 10.

The bracket 14 has a brace 26 on the side which lies opposite the stop 22. The brace 26 extends on the inside of the bracket 14 in a manner that it originates on the inside of the bracket and ends on said inside of the bracket. In this way, a cavity is created which is formed between brace 26 and bracket 14. The brace 26 is flexible. If a wiper arm 12 is now disposed in the wiper receptacle 20 and the bracket is closed, the wiper arm 12 is then fixedly held in the wiper receptacle 20 on the one hand by the stop 22 and on the other hand by the brace 26. In so doing, the brace 26 shapes itself in accordance with the wiper arm 12 in the direction of the cavity 28. As a result, the cavity 28 is reduced in size. A further measure to better fix the wiper arm 12 in the cavity 200 is provided by the nose 34 on the inside of the bracket 14. The nose 34, as a small triangular structure on the bracket 14, is designed in such a way that the nose 34 projects into the cavity 200. If the bracket 14 is now closed, the nose 34 then presses on the wiper arm 12. It is also conceivable to form a plurality of noses 34 on the inside of the bracket 14. It is likewise conceivable to give the nose 34 another shape than a triangular one. Hence, circular or punctiform noses are conceivable.

The closure as is illustrated in FIGS. 1 and 2 is a hook-shaped closure 16. In this case, a hook 30 is formed at the free end of the bracket 14. This bracket hook 30 engages around a base hook 32 which is formed at a free end of the base 21. This engagement is depicted in FIG. 2. An open closure 16 is illustrated in FIG. 1. At the free end 30 of the bracket 14, the bracket hook 160 points inwards with respect to the radial direction, while the base hook 161 points outwards at the free end 32 of the base 21. It is shown in FIG. 2 how the hooks 161, 160 engage in one another.

The tube receptacle 18 is formed on the side of the base 21 which is directed radially outwards, wherein the tube receptacle 18 has a circular recess 38 which is open towards the outside. The tube receptacle 18 is formed by two extensions 36. The two extensions 36 have free ends 40 which are directed outwards. Starting from the base 21, the extensions are mounted with the fixed ends thereof to the base and they extend radially outwards so that the free ends 40 thereof are directed away from the base. Thus, a tube 7, shown in FIG. 3, can be inserted from the outside into the tube receptacle 18. The circular recess 38 can at least partially deviate from the circular shape thereof. Hence, straight sections are formed in the tube receptacle 18 or respectively the recess 38 particularly in the region of the closure 16.

The bracket 14 extends, starting at one extension 36, past the stop 22. The bracket 14 is arranged such that said bracket is formed on the side of the base 21 which is opposite the tube receptacle 18. In doing so, the stop 22 and the bracket 14 are not connected directly to one another. The stop 22 and the bracket 14 are formed separately from one another, the stop 22 being mounted to the base, whereas the bracket 14 is formed on an extension 36.

The tube holder from FIGS. 1 and 2 is made from plastic. The plastic of the tube holder 10 is flexible.

An edge 44 is formed at the axial ends of the tube holder 10, said edge being directed outwards in the radial direction 2. A radius 46 is integrally formed on this edge 44, said radius being formed along the entire edge 44 or at least partially along the edge 44.

Figure 3:
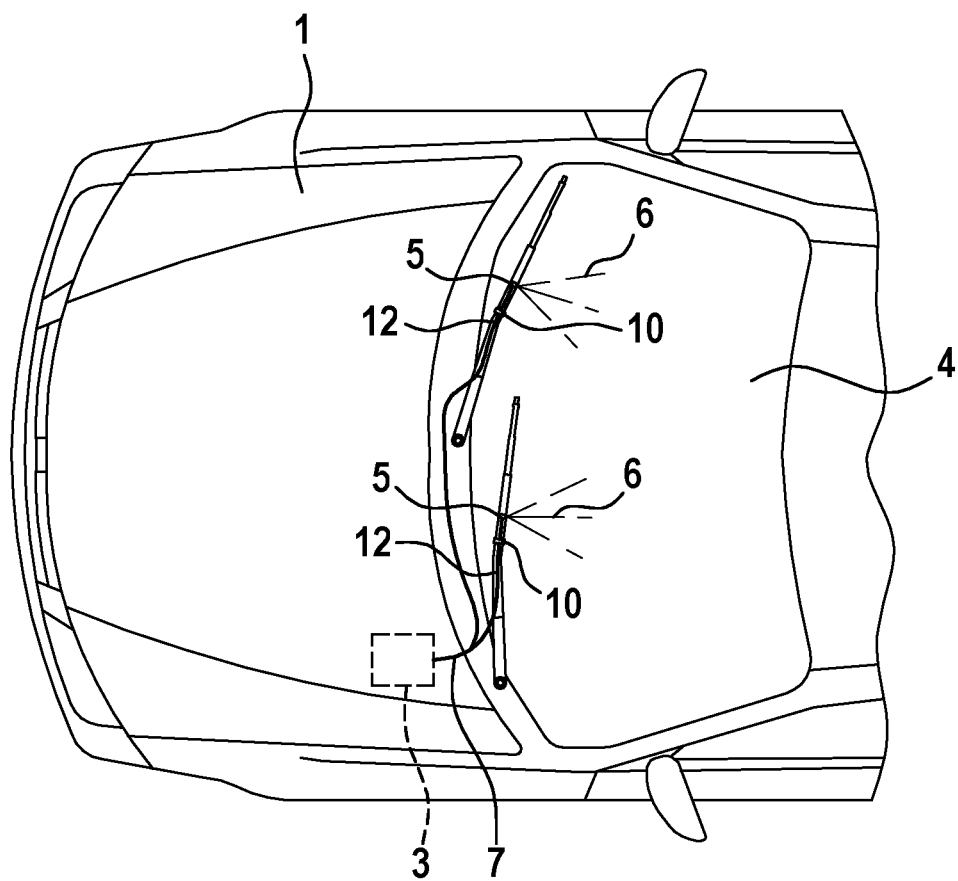
FIG. 3 shows a motor vehicle having a wiper arm, wherein a tube is positioned on the wiper arm by means of the inventive tube holder.

A motor vehicle is depicted in FIG. 3, which has a wiping water tank 3, a windshield 4 and a wiper arm 12. A spray nozzle 5, which sprays the wiping water 6 onto the windshield 4, is arranged on the wiper arm 12. The spray nozzle 5 is connected to the wiping water tank 3 by means of the tube 7. The tube 7 is at least partially arranged on the wiper arm 12. The tube 7 is attached to the wiper arm 12 by means of the tube holder 10 according to the invention. In so doing, the tube holder 10 is mounted on the wiper arm 12.

The features of all of the embodiments of the present invention can be combined with one another to form new embodiments according to the invention.

What is claimed is:

1. A tube holder (10) for a wiper arm (12), comprising a bracket (14), a positively locking closure (16) and a tube receptacle (18) and a wiper receptacle (20), wherein the bracket (14) is configured to be folded onto the wiper receptacle (20) so that the wiper receptacle (20) is closed by the bracket (14) and the bracket (14) is fixed on the wiper receptacle (20) by the closure (16) wherein the wiper receptacle (20) includes a base (21) and a flexible lateral stop (22) extending from the base (21), wherein the stop (22) is in a first rotational position relative to the base when the bracket (14) is in an opened state, wherein the bracket (14) is configured to be rotated to bear against the stop (22) in a closed state, wherein the bracket presses and rotate the stop (22) into a second rotational position relative to the base, such that the stop is pressed against the wiper arm (12) when the bracket is in the closed state.

2. The tube holder (10) according to claim 1, characterized in that the wiper receptacle (20) is a cavity (200) between the bracket (14) and the tube receptacle (18), wherein the base (21) lies opposite the bracket (14) with respect to the cavity (200).

3. The tube holder (10) according to claim 2, characterized in that a nose (34) is arranged on a side of the bracket (14) facing the cavity (200), said nose projecting into the wiper receptacle (20).

4. The tube holder (10) according to claim 2, characterized in that the tube receptacle (18) includes two extensions (36), which, starting from the base (21), extend away from the wiper receptacle (20), wherein a circular recess (38) is substantially formed between the extensions (36), wherein a diameter of the recess (38) is greater than a distance between free ends (40) of the extensions (36).

5. The tube holder (10) according to claim 4, characterized in that one of the extensions (36) continuously passes into the bracket (14).

6. The tube holder (10) according to claim 4, characterized in that the extensions (36) deviate from a circular shape thereof and comprise straight sections.

7. The tube holder (10) according to claim 2, characterized in that a nose (34) is arranged on a side of the bracket (14) facing the cavity (200), said nose projecting into the wiper receptacle (20), wherein the nose (34) is arranged on a section (140) of the bracket (14), which lies opposite and approximately parallel to the base (21).

8. The tube holder (10) according to claim 1, characterized in that the bracket (14) bears against the stop (22) from an outside in the closed state.

9. The tube holder (10) according to claim 1, characterized in that, on a side of the bracket (14) which faces the wiper receptacle (20), a brace (26) is laterally formed which lies opposite the stop (22), wherein a closed space (28) is formed between the bracket (14) and the brace (26).

10. The tube holder (10) according to claim 1, characterized in that the closure (16) is configured in a hook-shaped manner, wherein a bracket hook (160) is disposed at a free end (30) of the bracket (14) and a base hook (161) is disposed at a free end (32) of the base so that, in the closed state, the bracket hook (160) engages around the base hook (161).

11. The tube holder (10) according to claim 10, characterized in that the base hook (161) is arranged laterally and lies opposite the stop (22).

12. The tube holder (10) according to claim 1, characterized in that the tube holder (10) has an edge (44) at axial ends (42) thereof, said edge being directed radially outwards, wherein the edge (44) has a radius (46).

13. The tube holder (10) according to claim 1, characterized in that the tube holder (10) comprises a flexible plastic.

14. A wiper arm (12) having a tube holder (10) according to claim 1, said wiper arm being mounted on a motor vehicle (1).

15. A method for producing a tube holder (10) according to claim 1, characterized in that the tube holder (10) is extruded or injection molded.

16. A wiper assembly comprising a tube holder according to claim 1 and a wiper arm enclosed within the wiper receptacle of the tube holder, wherein the bracket (14) is folded onto the wiper receptacle (20) so that the wiper receptacle (20) is closed by the bracket (14) and the bracket (14) is fixed on the wiper receptacle (20) by the closure (16).

17. The tube holder (10) according to claim 1, characterized in that the wiper receptacle (20) is a cavity (200) between the bracket (14) and the tube receptacle (18), wherein the base (21) lies opposite and partially parallel to the bracket (14) with respect to the cavity (200).

18. The tube holder (10) according to claim 1, characterized in that the stop (22) has a free end (24).

19. The tube holder (10) according to claim 1, characterized in that, on a side of the bracket (14) which faces the wiper receptacle (20), a flexible brace (26) is laterally formed which lies opposite the stop (22), wherein a closed space (28) is formed between the bracket (14) and the brace (26).

20. The tube holder according to claim 1, wherein the flexible lateral stop (22) extends generally transversely to the base in the second rotational position.

21. The tube holder according to claim 1, wherein the positively locking closure (16) is spaced separately away from the stop (22).

* * * * *